United States Patent

[11] 3,628,825

| [72] | Inventor | Mitchell Hannoosh<br>c/o Poly Slides, Inc. Box 132, Wakefield, Mass. 01880 |
|---|---|---|
| [21] | Appl. No. | 5,624 |
| [22] | Filed | Jan. 26, 1970 |
| [45] | Patented | Dec. 21, 1971 |

[54] AUTOMOBILE CAMPER
5 Claims, 9 Drawing Figs.

[52] U.S. Cl.................................................. 296/23,
296/27, 135/1
[51] Int. Cl.................................................. B60p 3/34
[50] Field of Search......................................... 296/23 R,
23 MC; 135/1 A, 4 A, 3 A, 5 A; 214/515

[56] References Cited
UNITED STATES PATENTS

| 3,010,462 | 11/1961 | Barber | 135/5 A X |
| 3,160,434 | 12/1964 | Hedgepeth | 214/515 X |
| 3,185,518 | 5/1965 | Zentner | 296/23 X |

*Primary Examiner*—Philip Goodman
*Attorney*—Roberts, Cushman & Grover

ABSTRACT: A camper for mounting on the roof of an automobile, the camper comprising a rectangular frame slightly wider than the roof with a leg at each corner, pivots for connecting the legs to the frame to swing from horizontal positions at the sides of the frame to depending positions, the legs being longer than the height of the automobile so as to hold the frame above the roof when in said depending positions, and a hardtop covering said frame, pivots and legs when the legs are in said horizontal positions.

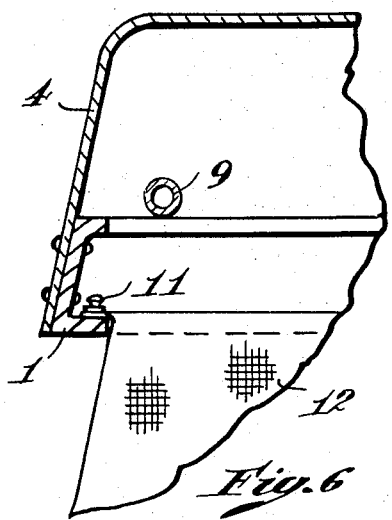
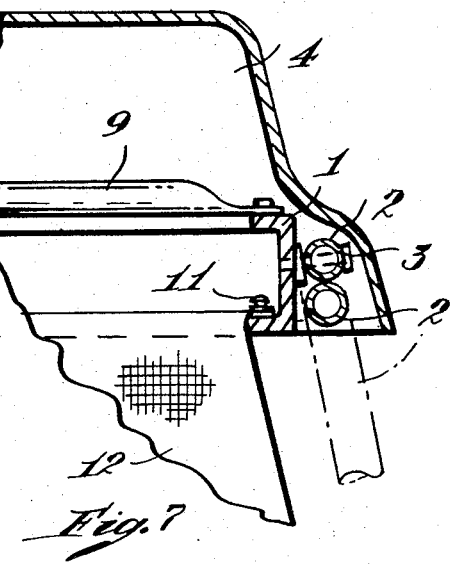
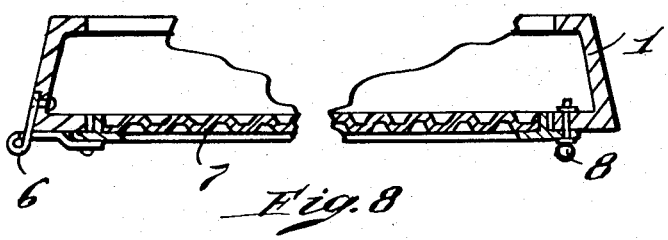
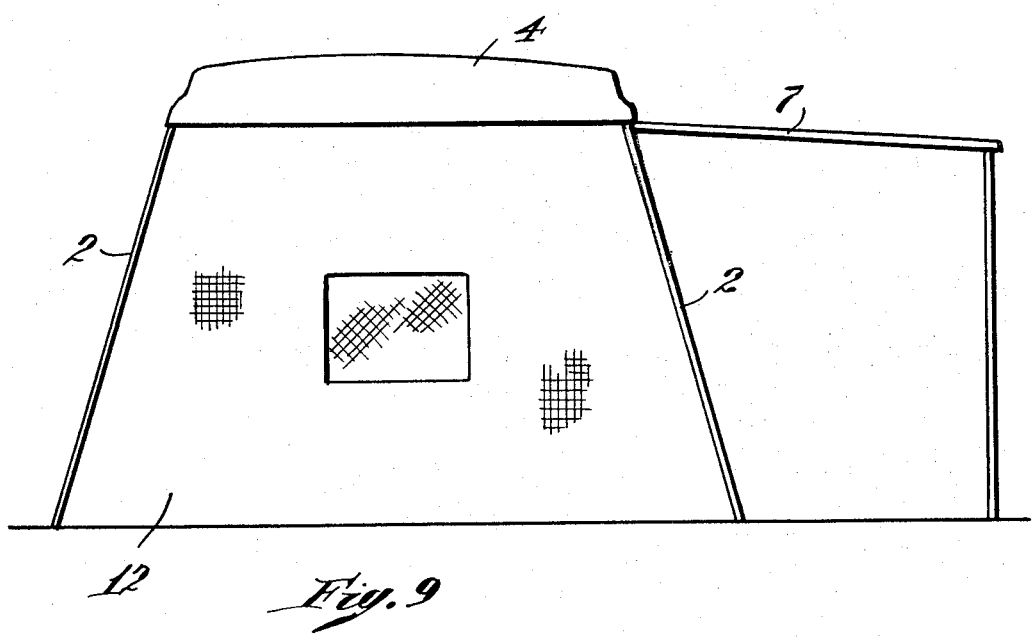

AUTOMOBILE CAMPER

Objects of the invention are to provide an automobile camper which can be carried on the roof of an automobile, which can easily be set up so that the automobile can be driven from under the camper, which is simple and economical to produce, and which is durable and reliable in use.

According to this invention the camper comprises a rectangular frame slightly larger than the automobile roof, a leg at each corner of the frame, pivots connecting the legs to the frame so that they may swing downwardly from horizontal positions at the sides of said frame to depending positions, the legs being longer than the height of the automobile so as to hold said frame above said roof when in said depending positions, and a hard top covering said frame and pivots and legs when the legs are in said horizontal positions.

Preferably said pivots incline upwardly and outwardly so that the legs spread sidewise when in depending position. More specifically the camper comprises a cover for the underside of said frame, the cover being pivoted to one side of the frame to swing downwardly and outwardly approximately 180° to serve as a canopy, and the camper has a storage space between said frame and top with tent sides stored in said space, the sides being secured to said frame so as to depend from the frame when said cover is swung as aforesaid.

For the purpose of illustration a typical embodiment of the invention is shown in the accompanying drawings in which FIG. 1 is a rear view of the camper lifted from an automobile;

FIG. 6 is a section on line 6—6 of FIG. 3;

FIG. 7 is a section on line 7—7 of FIG. 3;

FIG. 8 is a section on line 8—8 of FIG. 3, showing only the aforesaid frame and cover; and FIG. 9 is a side view of the camper after being set up.

Figure 1:
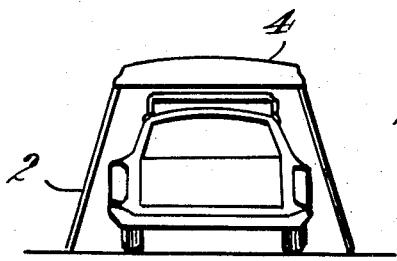
Figure 3:
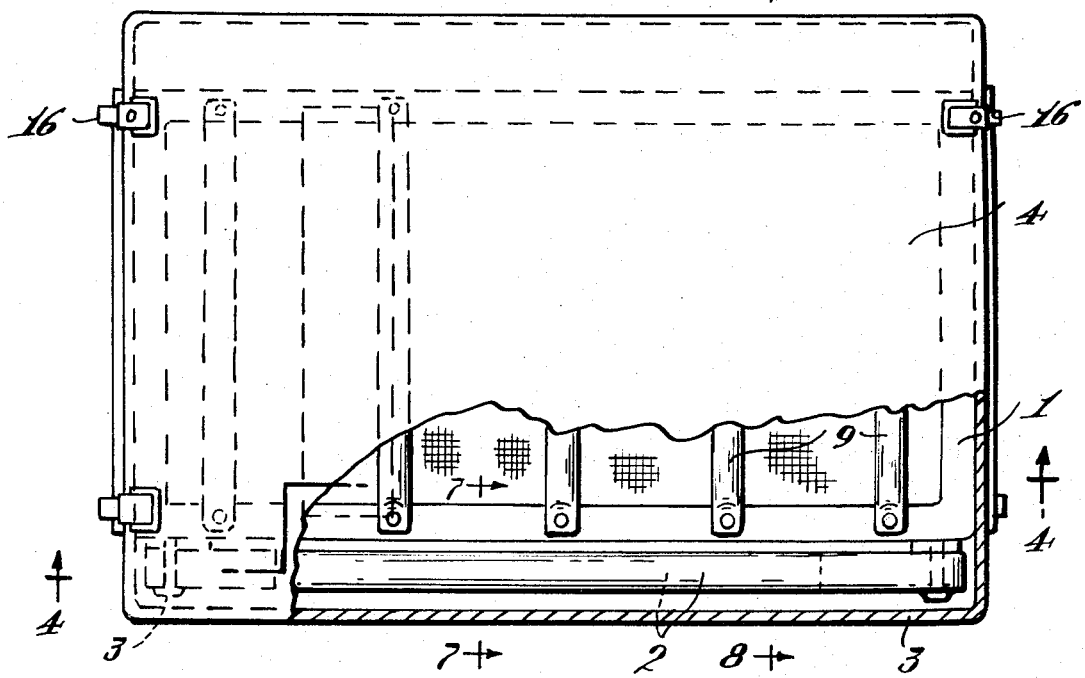
FIG. 3 is a plan view with a part of the hard top broken away.
Figures 4, 5:
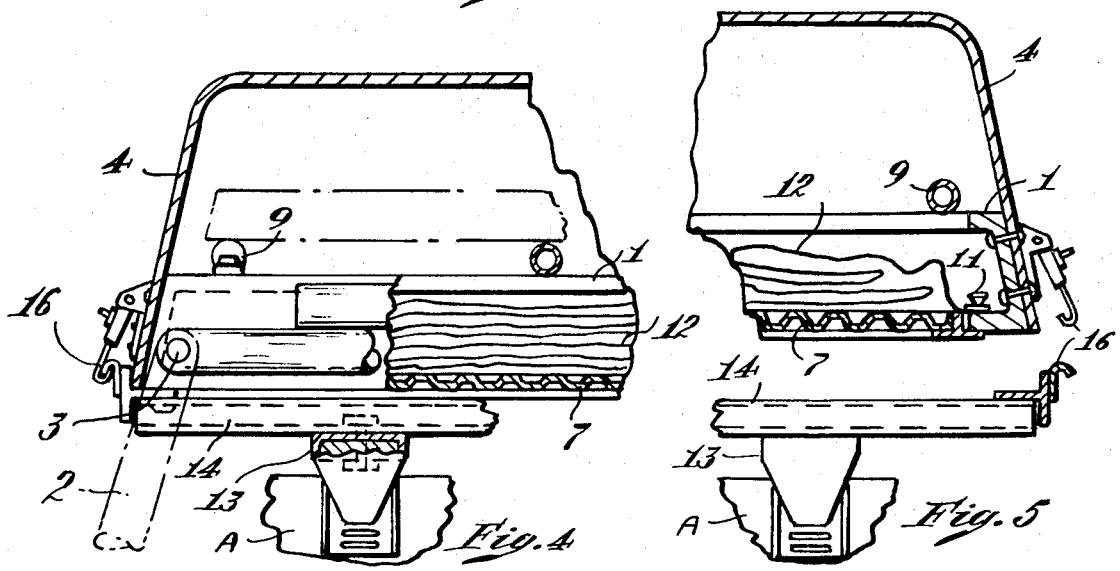
FIG. 4 is a section on line 4—4 of FIG. 3.
FIG. 5 is a similar section with the camper lifted off the automobile.

The particular embodiment of the invention chosen for the purpose of illustration comprises a rectangular frame 1, a leg 2 at each corner of the frame, pivots 3 interconnecting the legs with the frame so that they may swing downwardly from the horizontal positions shown in FIGS. 3, 4 and 7 to the depending positions shown in FIGS. 1 and 9, the legs being longer than the height of the automobile so as to hold the frame above the automobile roof when in the depending positions as shown in FIG. 1, and a hard top 4 covering the frame, pivots and legs when the legs are in horizontal positions as shown in FIGS. 3, 4 and 7. As shown in FIG. 7 the pivots 3 incline upwardly and outwardly so that the legs spread sidewise when in depending position as shown in FIG. 1. As shown in FIG. 4 the hard top 4 limits the extent to which the legs may be swung. Hinged to the bottom of the frame 1 at 6 is a cover 7 which may be held closed by any suitable fastener as indicated at 8 in FIG. 8. When unfastened the cover may swing outwardly to approximately 180° to serve as a canopy as shown in FIG. 9. Extending between opposite sides of the frame 1 are bars 9 for supporting articles, such as cots, in the hard top. Fast to the four sides of the frame 1 by means of snap fasteners 11 is a tent 12 which may be stored in the space between the cover 7 and the bars 9 as shown in FIGS. 4 and 5. When the cover is swung outwardly as aforesaid the tent sides drop down to the positions shown in FIGS. 6, 7 and 9.

The frame 1 may be mounted on the automobile in any suitable way. As shown in FIGS. 4 and 5 crossbars 13 are mounted on the automobile A in well-known manner. Mounted on the crossbars are longitudinal bars 14 on which rest the frame 1. The frame may be detachably secured to the bars 14 by means of hooks 16.

Figure 2:
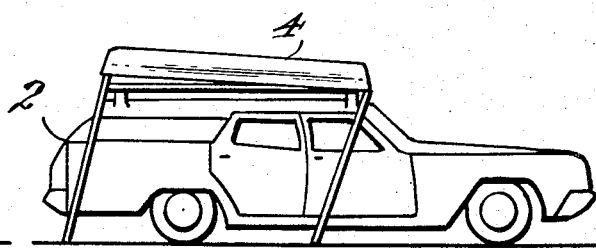
FIG. 2 is a side view with only the rear end of the camper lifted.

To assemble the camper the fasteners 16 are unhooked and the legs are swung from the horizontal positions shown in FIGS. 3, 4 and 7 to the depending position shown in FIGS. 1, 2 and 9, thereby lifting the frame off the bars 14. Then the automobile may be driven from under the camper. After the automobile is removed the cover 7 is swung from the closed position to the position shown in FIG. 9 to serve as a canopy. This permits the tent 12 to drop down to the position shown in FIG. 12 in which position it may be secured in well-known manner with stakes or the like.

I claim:

1. For mounting on the roof of an automobile a camper comprising a rectangular frame having vertically spaced upper and lower sides, said frame being slightly wider than said roof, a leg at each corner of the frame, pivots connecting the legs to the frame so that they may swing downwardly from horizontal position at the sides of said frame to depending positions, said legs being longer than the height of the automobile so as to hold said frame above said roof in said depending position, a hard top covering said frame, pivots and legs when the legs are in a horizontal position, said frame having between its upper and lower sides a storage space, a cover for the underside of the frame, said cover being pivoted to one side of the frame to swing downwardly and outwardly approximately 180° to serve as a canopy, and a tent stored in said storage space, the sides being secured to the lower side of said frame so as to depend from the frame when said cover is swung as aforesaid.

2. A camper according to claim 1, having a storage space above the upper side of said frame between it and the hard top.

3. A camper according to claim 1, wherein said pivots incline upwardly and outwardly so that the legs spread sidewise when in depending position.

4. A camper according to claim 3, wherein the outward spreading of said legs is limited by engagement thereof with the lower edge of the hard top.

5. A camper according to claim 2, wherein a plurality of spaced parallel, transversely extending bars form the floor of the space between the upper side of the frame and the hard top and the roof of the space between the upper and lower sides of the frame.

* * * * *